United States Patent
Kato et al.

(10) Patent No.: US 8,211,543 B2
(45) Date of Patent: Jul. 3, 2012

(54) CUSHION FOR POLISHING PAD AND POLISHING PAD USING THE CUSHION

(75) Inventors: Mitsuru Kato, Kurashiki (JP); Hirofumi Kikuchi, Kurashiki (JP); Shinya Kato, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 331 days.

(21) Appl. No.: 12/531,647

(22) PCT Filed: Mar. 19, 2008

(86) PCT No.: PCT/JP2008/055030
§ 371 (c)(1),
(2), (4) Date: Sep. 16, 2009

(87) PCT Pub. No.: WO2008/123085
PCT Pub. Date: Oct. 16, 2008

(65) Prior Publication Data
US 2010/0120343 A1    May 13, 2010

(30) Foreign Application Priority Data
Mar. 20, 2007  (JP) ................. 2007-071975

(51) Int. Cl.
*B24D 11/00* (2006.01)
*B32B 25/08* (2006.01)
*B32B 25/16* (2006.01)
*B32B 25/20* (2006.01)
*B32B 27/40* (2006.01)

(52) U.S. Cl. ............... 428/423.1; 428/423.3; 428/425.5; 428/447; 428/521; 421/533

(58) Field of Classification Search ................. None
See application file for complete search history.

(56) References Cited

U.S. PATENT DOCUMENTS 6,318,783 B1 * 11/2001 Knox ................. 296/39.1
2001/0053841 A1 * 12/2001 Kaufhold et al. ........... 528/48

FOREIGN PATENT DOCUMENTS

| JP | 2004-228265 A | 8/2004 |
| JP | 2005-054072 A | 3/2005 |
| JP | 2006-339570 A | 12/2006 |

* cited by examiner

*Primary Examiner* — Ramsey Zacharia
(74) *Attorney, Agent, or Firm* — Leydig, Voit & Mayer, Ltd.

(57) ABSTRACT

The invention provides a cushion for a polishing pad, wherein, when a dynamic compression viscoelasticity measurement is performed under conditions of 23° C., a static load of 27.6 kPa, a frequency of 11 Hz and an amplitude of 1 μm, (1) a phase difference between dynamic stress and deformation is 4° or less, and (2) a ratio of the maximum value of the deformation amount to the maximum value of the dynamic stress ([maximum value of deformation amount]/[maximum value of dynamic stress]) is 0.5 μm/kPa or more. The invention also provides a polishing pad having a layer of the cushion for a polishing pad and a polishing layer.

24 Claims, No Drawings

CUSHION FOR POLISHING PAD AND POLISHING PAD USING THE CUSHION

TECHNICAL FIELD

The present invention relates to a cushion for a polishing pad and a polishing pad using the cushion, and the polishing pad is useful for polishing a material to be polished, for example, a semiconductor wafer and the like, at good precision and high polishing efficiency.

BACKGROUND ART

Conventionally, comparatively soft polishing pads obtained by impregnating an unwoven fabric with a polyurethane resin and hard polishing pads made of foamed polyurethane have been used for polishing pads for processing a mirror surface of a semiconductor wafer used as a substrate for forming an integrated circuit or processing unevenness of an insulating film or an electric conductor film into flatness during semiconductor device production (For example, see patent documents 1 to 3).

In particular, in order to have both high flatness in a local scale (die size) and evenness of a film thickness in a global scale (wafer size) accompanied by miniaturization and multilayer structures of recent semiconductors, a double layered pad having a hard polishing layer as a surface layer and a soft cushion layer on the rear surface has been commonly used. In such a double layered pad, the cushion layer on the rear surface deforms the polishing layer as the surface layer conforming with undulation having a comparatively long wavelength of a film to be polished present in the wafer surface and thus serves as making the whole wafer uniformly polished. Layers having a specific strain coefficient, a volume elastic modulus, and the like have been suggested as a cushion layer used in the double-layered pad (For example, see patent documents 4 to 6).

In recent years, miniaturization, high integration, and multilayered wiring of semiconductor devices have been furthermore progressed, and a polishing pad has been also required to stably achieve further higher flatness and evenness of a film thickness after polishing. However, in the polishing pad shown in patent document 4, there is no indication as the characteristics required for a cushion layer, other than a strain constant when compression pressure is received, and the strain constant shown herein easily causes decrease in a polishing rate due to a too soft cushion layer. Further, a deformation amount measured in a state where a compression pressure is constant or monotonously increases (or monotonously decreases) does not correspond to a deformation amount in a case where a compression pressure is repeatedly changed in a very short time cycle such as a time of actual polishing in many cases.

On the other hand, the polishing pad shown in patent document 5 or 6 does not necessarily have sufficient conformity to undulation of a film on a wafer surface; as a result, evenness of a film thickness after polishing may be insufficient. When particularly a polishing layer as a surface layer is made from a resin with a non-foam structure, such a polishing layer has high heat conductivity as compared to a polishing layer with a foam structure, and thus, temperature increase due to heat generation during polishing easily transmits to a cushion layer on the rear surface to change physical properties of the cushion layer due to temperature increase, which easily gives an influence on polishing characteristics such as uniformity. In particular, a material to be polished has a wiring metallic film and the metallic film is formed from copper and the like, heat generation during polishing is large and the above described influence is likely to appear.

A polishing pad obtained by using a cushion layer having a micro rubber A hardness of 50 or more and 90 or less, and a specific hysteresis loss and a tan δ value has been known (see patent document 7). However, the polishing pad shown in patent document 7 does not necessarily have an appropriate deformation amount of the cushion layer for undulation of a film on a wafer surface, and when a deformation amount of the cushion layer is too small, evenness of a film thickness after polishing becomes insufficient, and on the other hand, when a deformation amount of the cushion layer is too large, in addition that a polishing rate easily decreases, there is a problem that evenness of a film thickness after polishing also decreases. In the same manner as the polishing pads described in patent documents 5 and 6, particularly when a polishing layer as a surface layer is formed from a resin with a non-foam structure, such a polishing layer has high heat conductivity as compared to a polishing layer with a foam structure, and thus, temperature increase due to heat generation during polishing easily transmits to a cushion layer on the rear surface to change physical properties of the cushion layer due to temperature increase, which easily gives an influence on polishing characteristics such as uniformity. In particular, a material to be polished has a wiring metallic film and the metallic film is formed from copper, and the like, heat generation during polishing is large and the above described influence is likely to appear.

patent document 1: JP-A-5-8178
patent document 2: JP-A-2000-178374
patent document 3: JP-A-2001-89548
patent document 4: JP-A-5-505769
patent document 5: JP-A-2000-117619
patent document 6: JP-A-2000-202763
patent document 7: JP-A-2006-339570

DISCLOSURE OF THE INVENTION

Problems To Be Solved By the Invention

An object of the present invention is to provide a polishing pad that is excellent in flatness of a surface to be polished and evenness of a film thickness after polishing and also excellent in a polishing rate, and can achieve excellent polishing to a material to be polished such as an insulating film, a metallic film, etc, and a cushion using for the polishing pad.

Means For Solving the Problems

The present inventors have repeated intensive studies in order to achieve the above described objects. As a result, they have found that the above objects can be achieved by a cushion having a specific dynamic compression viscoelasticity and a polishing pad having a layered structure obtained by laminating a layer of the cushion and a polishing layer made of a resin with a non-foam structure, and as a result of further studies based on these findings, the present invention has been completed.

That is, the present invention provides:
[1] a cushion for a polishing pad, wherein, when a dynamic compression viscoelasticity measurement is performed under conditions of 23° C., a static load of 27.6 kPa, a frequency of 11 Hz and an amplitude of 1 μm,
(1) a phase difference between dynamic stress and deformation is 4° or less, and
(2) a ratio of the maximum value of the deformation amount to the maximum value of the dynamic stress ([maximum value of deformation amount]/[maximum value of dynamic stress]) is 0.5 μm/kPa or more;

[2] the cushion for a polishing pad of [1], wherein, when the dynamic compression viscoelasticity measurement is performed under conditions of 50° C., a static load of 27.6 kPa, a frequency of 11 Hz and an amplitude of 1 μm, (3) a phase difference between dynamic stress and deformation is 4° or less, and (4) a ratio of the maximum value of the deformation amount to the maximum value of the dynamic stress ([maximum value of deformation amount]/[maximum value of dynamic stress]) is 0.5 to 1.5 μm/kPa;

[3] the cushion for a polishing pad of [1] or [2], wherein, when the dynamic compression viscoelasticity measurement is performed under conditions of 23° C., a static load of 27.6 kPa, a frequency of 88 Hz and an amplitude of 1 μm, (5) a phase difference between dynamic stress and deformation is 8° or less, and (6) a ratio of the maximum value of the deformation amount to the maximum value of the dynamic stress ([maximum value of deformation amount]/[maximum value of dynamic stress]) is 0.5 to 1.5 μm/kPa;

[4] a polishing pad having a layer of the cushion for a polishing pad of any of [1] to [3], and a polishing layer;

[5] the polishing pad of [4], wherein the polishing layer is a resin layer with a non-foam structure;

[6] the polishing pad of [4] or [5], wherein the polishing layer comprises a polymer material having a tensile elastic modulus at 50° C. after saturation swelling with water at 50° C. of 130 to 800 MPa, a loss tangent at 50° C. of 0.2 or less, and a contact angle with water of 80° or less;

[7] the polishing pad of any of [4] to [6], wherein the polishing layer comprises a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) of 55% or more;

[8] the polishing pad of any of [4] to [7], wherein the polishing layer comprises a polymer material having a ratio ($E'_{23}/E'_{50}$) of a storage elastic modulus at 23° C. ($E'_{23}$) to a storage elastic modulus at 50° C. ($E'_{50}$) of 1.8 or less;

[9] the polishing pad of any of [4] to [8], wherein the polishing layer comprises polyurethane obtained by reacting a polymer diol, an organic diisocyanate, and a chain extender; and

[10] the polishing pad of [9], wherein the polyurethane is thermoplastic polyurethane having a content rate of nitrogen atoms derived from the organic diisocyanate of 4.8% by mass or more and less than 6.0% by mass.

Effects of the Invention

The polishing pad of the present invention is useful for chemical mechanical polishing an insulating film such as an oxide film formed on a semiconductor substrate (wafer) or a metallic film, and is excellent in flatness of a surface to be polished and evenness of a film thickness after polishing, and also excellent in a polishing rate, and thus excellent in polishing uniformity of a material to be polished such as an insulating film, a metallic film and the like. In particular, also when these insulating film and metallic film form patterns, a polishing rate and polishing uniformity are excellent in convex portions in the patterns, and when a polishing layer is a resin layer with a non-foam structure, the above described effects are significant, and particularly when an insulating film or a metallic film on which a pattern is formed is polished, a polishing rate and polishing uniformity are excellent also in a concave portion. Further, when a polishing layer is made of thermoplastic polyurethane with a non-foam structure and having a specific physical property, the effects become more significant.

BEST MODE FOR CARRYING OUT THE INVENTION

The present invention will be specifically described in the following.

The cushion for a polishing pad of the present invention (hereinafter may be simply referred to as "cushion") satisfies the following conditions (1) and (2):

(1) a phase difference between dynamic stress and deformation is 4° or less; and (2) a ratio of the maximum value of the deformation amount to the maximum value of the dynamic stress ([maximum value of deformation amount]/[maximum value of dynamic stress]) is 0.5 μm/kPa or more, when a dynamic compression viscoelasticity measurement is performed under conditions of 23° C., a static load of 27.6 kPa, a frequency of 11 Hz and an amplitude of 1 μm.

In the dynamic viscoelasticity measurement, deformation (strain), that has a size and a direction in tangent waves and is changed periodically, is given to a sample in a state of charging a constant static load to measure a stress (dynamic stress) in such a state. As a deformation mode of a sample, a cushion is subjected to compression in the present invention. In the dynamic viscoelasticity measurement, a phase difference between dynamic stress and deformation means a time gap until deformation is caused in the sample after giving a dynamic load, and a smaller number thereof means that, when a dynamic load is changed, deformation corresponding to the dynamic load rapidly occurs.

The cushion of the present invention has a phase difference between dynamic stress and deformation of 4° or less when a dynamic compression viscoelasticity measurement was performed under conditions of 23° C., a static load of 27.6 kPa, a frequency of 11 Hz and an amplitude of 1 μm. Therefore, the polishing pad rapidly conforms to undulation of a film formed on a wafer surface and can polish a material while a film thickness is uniformly maintained. The phase difference is preferably 3° or less, and more preferably 2° or less. Since one cycle of tangent waves of dynamic stress and deformation is 0.091 seconds at a frequency of 11 Hz, the phase difference between dynamic stress and deformation of 4° means that time points when the respective tangent waves of the dynamic stress and the deformation become the maximum values deviate each other for 0.001 seconds (=0.091 seconds×4°/360°).

The cushion of the present invention is required to have a ratio of the maximum value of the deformation amount to the maximum value of the dynamic stress ([maximum value of deformation amount]/[maximum value of dynamic stress]) of 0.5 μm/kPa or more when a dynamic compression viscoelasticity measurement is performed under conditions of 23° C., a static load of 27.6 kPa, a frequency of 11 Hz and an amplitude of 1 μm, in order to deform a polishing pad corresponding to undulation of a film formed on a wafer surface. When the ratio of the maximum value of the deformation amount to the maximum value of the dynamic stress is less than 0.5 μm/kPa, evenness of a film thickness after polishing is insufficient. On the other hand, when the ratio exceeds 1.5 μm/kPa, polishing pressure during polishing does not sufficiently transmit to a material to be polished, and a polishing rate easily decreases, and evenness of a film thickness after polishing also tends to decrease, and thus, the ratio is preferably within the range from 0.6 to 1.5 μm/kPa, and more preferably within the range from 0.7 to 1.4 μm/kPa, and further more preferably within the range from 0.8 to 1.3 μm/kPa.

In the dynamic compression viscoelasticity measurement of the cushion, a frequency of 11 Hz as a measurement condition is a frequency to which a cushion is exposed in many cases when a commonly used polishing machine that rotates a polishing pad and a wafer in the same direction to a wavelength of undulation of a film formed on a wafer surface is used. For example, the frequency roughly corresponds to a case where a polishing pad having a diameter of 51 cm rotates at a speed of 50 rpm, the center of the wafer is located at a middle point between the center and an external edge of the polishing pad (position at 12.75 cm from the center of the polishing pad), the wafer rotates at a speed of 50 rpm in the same direction as the polishing pad, and a wavelength of undulation on the wafer surface is 60 mm. When a die size is 10 mm, a wavelength of undulation of 60 mm corresponds to a length of 6 dies.

A static load of 27.6 kPa indicates a typical polishing pressure applied in general polishing.

The cushion of the present invention preferably has a phase difference between dynamic stress and deformation of 4° or less when a dynamic compression viscoelasticity measurement is performed under conditions of 50° C., a static load of 27.6 kPa, a frequency of 11 Hz and an amplitude of 1 μm, even in a case where a temperature of the polishing pad significantly increases due to heat generation during polishing, since evenness of a film thickness after polishing is favorable. The phase difference is preferably 3° or less, and more preferably 2° or less.

The cushion of the present invention preferably has a ratio of the maximum value of the deformation amount to the maximum value of the dynamic stress ([maximum values of deformation amount]/[maximum value of dynamic stress]) of 0.5 to 1.5 μm/kPa when a dynamic compression viscoelasticity measurement is performed under conditions of 50° C., a static load of 27.6 kPa, a frequency of 11 Hz and an amplitude 1 μm, even in a case where a temperature of the polishing pad significantly increases due to heat generation during polishing, since a polishing rate and evenness of a film thickness after polishing are favorable. The ratio is preferably within the range from 0.6 to 1.45 μm/kPa, more preferably from 0.7 to 1.4 μm/kPa, and particularly preferably from 0.8 to 1.3 μm/kPa.

The cushion of the present invention preferably has a phase difference between dynamic stress and deformation of 8° or less when a dynamic compression viscoelasticity measurement is performed under conditions of 23° C., a static load of 27.6 kPa, a frequency of 88 Hz and an amplitude of 1 μm, even in a case where a cycle of undulation of a film to be polished is very short or a relative speed between a polishing pad and a wafer during polishing is very high, since evenness of a film thickness after polishing is favorable. The phase difference is preferably 7° or less, and more preferably 6° or less.

The cushion of the present invention preferably has a ratio of the maximum value of the deformation amount to the maximum value of the dynamic stress ([maximum value of deformation amount]/[maximum value of dynamic stress]) of 0.5 to 1.5 μm/kPa when a dynamic compression viscoelasticity measurement is performed under conditions of 23° C., a static load of 27.6 kPa, a frequency of 88 Hz and an amplitude of 1 μm, even in a case where a cycle of undulation of a film to be polished is very short or a relative speed between a polishing pad and a wafer during polishing is very high, since a polishing rate and evenness of a film thickness after polishing are favorable. The ratio is preferably within the range from 0.6 to 1.45 μm/kPa, more preferably from 0.7 to 1.4 μm/kPa, and particularly preferably from 0.8 to 1.3 μm/kPa.

A frequency of 88 Hz as a measurement condition roughly corresponds to, for example, a case where a polishing pad having a diameter of 76 cm rotates at a speed of 90 rpm, and the center of the wafer is located at a middle point between the center and an external edge of the polishing pad (the position at 19 cm from the center of the polishing pad), and the wafer rotates at a speed of 90 rpm in the same direction as the polishing pad, and a wavelength of undulation of the wafer surface is 20 mm. When a die size is 10 mm, a wavelength of undulation of 20 mm corresponds to a length of 2 dies.

The dynamic compression viscoelasticity measurement on the cushion of the present invention under conditions of 23° C. or 50° C., a static load of 27.6 kPa, a frequency of 11 Hz or 88 Hz, and an amplitude 1 μm can be performed by measuring a dynamic compression viscoelasticity using a dynamic compression viscoelasticity measurement device in a compression mode while changing a temperature under conditions of a measurement frequency of 11 Hz or 88 Hz, a static load of 27.6 kPa, and an amplitude of 1 μm, and employing measurement results at a temperature of 23° C. or 50° C., as described in the section of examples.

Materials for the cushion of the present invention are not particularly limited, and for example, elastomers with a non-foam structure or a foam structure and materials obtained by impregnating an unwoven fabric with a resin can be used. In particular, materials showing the above described dynamic compression viscoelasticity can be selected and its availability is also excellent, and thus, synthetic rubbers such as polyurethane and chloroprene rubber, elastomers such as silicone rubbers, and the like are preferable and, among these materials, those with non-foam structures are more preferable.

Dynamic compression viscoelasticities of these elastomers depend on molecular mobility of molecular chains constituting the elastomers. Generally, an elastomer is constituted with a soft phase for imparting deformation property under load and a constrained phase for returning to an original shape when the load is removed. The dynamic compression viscoelasticity of the elastomer can be controlled by changing a ratio of the soft phase to the constrained phase or a degree of phase separation, or changing a glass transition temperature of the soft phase, etc.

For example, polyurethane can be obtained by reacting a polymer polyol, an organic diisocyanate, and a chain extender, and in such polyurethane, the polymer polyol as a raw material forms a soft phase, and the organic diisocyanate and chain extender form a constrained phase. A phase difference between dynamic stress and deformation when a dynamic compression viscoelasticity measurement is performed can decrease its value, for example, generally by lowering a use ratio of a polymer polyol contained in the polyurethane materials to reduce the ratio of the soft phase in polyurethane, selecting a polymer polyol as a raw material with larger hydrophobicity or a larger molecular weight to increase a degree of phase separation of the soft phase and the constrained phase in polyurethane, or selecting a polymer polyol as a raw material having a low glass transition temperature.

A ratio of the maximum value of the deformation amount to the maximum value of the dynamic stress ([maximum value of deformation amount]/[maximum value of dynamic stress]) when a dynamic compression viscoelasticity is performed can be changed in its value, for example, generally by changing a use ratio of a polymer polyol contained in the polyurethane materials to change a ratio of a soft phase in polyurethane, using a polymer polyol as a raw material having a degree of hydrophilicity different from that of a constrained phase to change a degree of phase separation of the soft phase and the constrained phase in polyurethane, or selecting a polymer polyol as a raw material having a different glass transition temperature. These parameters described above are suitably set and materials are selected to thereby form polyurethane having a desired dynamic compression viscoelasticity, and it is preferable, as the polymer polyol, to use a polymer diol having a ratio (C/O) of the number of carbon atoms (C) and the number of oxygen atoms (O) of 2.5 to 5, for example, polyether diols such as polytetramethylene glycol, and poly(methyltetramethylene glycol); and polyester diols such as polybutylene adipate diol, polybutylene sebacate diol, polyhexamethylene adipate diol, poly(3-methyl-1, 5-pentamethylene adipate)diol, poly(3-methyl-1,5-pentamethylene sebacate)diol, polynonamethylene adipate diol, poly(2-methyl-1,8-octamethylene adipate)diol, and polycaprolactone diol. A ratio of the polymer diol contained in the polyurethane raw materials is preferably within the range from 60 to 85% by mass, and more preferably from 65 to 80% by mass. A glass transition temperature of the polymer diol is preferably 0° C. or less, and more preferably −20° C. or less. A number average molecular weight of the polymer diol is preferably within the range from 2000 to 5000, more preferably within the range from 2500 to 4500, and further more preferably within the range from 3000 to 4000.

Examples of the organic diisocyanate constituting, the constrained phase include isophorone diisocyanate, hexamethylene diisocyanate, norbornene diisocyanate, 2,4-tolylene diisocyanate, 2,6-tolylene diisocyanate, 4,4'-dicyclohexylmethane diisocyanate, 4,4'-diphenylmethane diisocyanate, xylylene diisocyanate and the like, and at least one of these substances can be used. Among these examples, 4,4'-diphenylmethane diisocyanate is preferably used.

For the chain extender constituting the constrained phase, a low molecular compound having a molecular weight of 300 or less and containing two or more of active hydrogen atoms capable of reacting with an isocyanate group in its molecule can be used, and examples thereof include diols such as ethylene glycol, diethylene glycol, 1,2-propanediol, 1,3-propanediol, 1,4-butanediol, neopentyl glycol, 1,6-hexanediol, 3-methyl-1,5-pentanediol, 1,4-bis(3-hydroxyethoxy)benzene, 1,4-cyclohexanediol, 1,4-cyclohexanedimethanol, and 1,9-nonanediol; and diamines such as ethylenediamine, trimethylenediamine, tetramethylenediamine, hexamethylenediamine, nonamethylenediamine, hydrazine, dihydrazide adipate, xylenediamine, isophoronediamine, piperazine, 4,4'-diaminodiphenylmethane, and 4,4'-methylene-bis(2-chloroaniline), and at least one of these substances can be used. Among these examples, 1,4-butanediol is preferably used.

A dynamic compression viscoelasticity can be set within a desired range also in silicone rubbers, chloroprene rubbers, and the like, by selecting a ratio of a soft phase to a constrained phase, or a glass transition temperature of the soft phase. That is, a ratio of the maximum value of a deformation amount to the maximum value of a dynamic stress ([maximum value of deformation amount]/[maximum value of dynamic stress]) when a dynamic compression viscoelasticity measurement is performed can be changed in its value by changing a ratio of the constrained phase or a glass transition temperature of the soft phase. A value of a phase difference between dynamic stress and deformation when a dynamic compression viscoelasticity measurement is performed can be decreased by increasing the ratio of the constrained phase or lowering the glass transition temperature of the soft phase. In addition, in the chloroprene rubber, a glass transition temperature of a soft phase can be decreased by, for example, increasing a ratio of trans-1,4 bonds in a molecular conformational structure (a ratio of trans-1,4 bonds, cis-1,4 bonds, 1,2-bonds or 3,4-bonds), or copolymerizing butadiene, etc. with chloroprene as the main raw material, and also, a ratio of a constrained phase can be increased by increasing an amount of crosslinking by sulfur, peroxides, and the like.

The phase difference between dynamic stress and deformation and the ratio of the maximum value of the deformation amount to the maximum value of the dynamic stress ([maximum value of deformation amount]/[maximum value of dynamic stress]) defined in the present invention when the dynamic compression viscoelasticity measurement is performed can be easily measured by using a dynamic compression viscoelasticity measurement device as described later in the section of examples. Therefore, a commercially available material that satisfies the above described phase difference between dynamic stress and deformation and the ratio of the maximum value of the deformation amount to the maximum value of the dynamic stress ([maximum value of deformation amount]/[maximum value of dynamic stress]) is possibly used as a material for the cushion of the present invention.

A method of forming the cushion is not particularly limited, and for example, a sheet is formed by any known methods such as extrusion forming, injection molding, calender forming, flatfilm extrusion and the like, and the sheet can be used as a cushion layer.

The thickness of the cushion layer is not particularly limited, and since a dynamic compression viscoelasticity is easily set within a desired range and a value of the dynamic compression viscoelasticity does not fluctuate to be easily stable, the thickness is preferably within the range from 0.3 to 5.0 mm, more preferably within the range from 0.5 to 4.0 mm, and further more preferably within the range from 0.7 to 3.0 mm.

The polishing pad of the present invention has the above described cushion layer of the present invention and a polishing layer functioning as a polishing material. The cushion layer and the polishing layer can be laminated with a known tackifier or adhesive agent. The cushion layer may also be used in a state that two types of layers are laminated. In this case, the dynamic compression viscoelasticity of the cushion is measured in a state of laminating all cushion layers to be used.

A resin layer with a non-foam structure is preferably used for a polishing layer constituting the polishing pad of the present invention since fluctuation in polishing characteristics due to foaming unevenness does not occur, a life duration of the polishing pad is also excellent, and further, heat conductivity is higher than that of a foam resin, and thus, unevenness of a temperature in the polishing pad is less and polishing uniformity is also excellent.

The above polishing layer is preferably constituted with a polymer material having a tensile elastic modulus at 50° C. after saturation swelling with water at 50° C. of 130 to 800 MPa, a loss tangent (tan δ) at 50° C. of 0.2 or less, and a contact angle with water of 80° or less.

When the tensile elastic modulus (value at 50° C. after saturation swelling with water at 50° C.) of the polymer material constituting the polishing layer is less than 130 MPa, a polishing pad becomes too soft, and thus, flatness of a surface to be polished may decrease or a polishing efficiency may be lowered. On the other hand, the tensile elastic modulus (value at 50° C. after saturation swelling with water at 50° C.) of the polymer material constituting the polishing layer is more than 800 MPa, generation of scratches tends to increase. For example, from the viewpoints of flatness of a surface to be polished and suppression of scratches, the tensile elastic modulus (value at 50° C. after saturation swelling with water at 50° C.) of the polymer material constituting the polishing layer is preferably within the range from 180 to 750 MPa, more preferably within the range from 230 to 700 MPa, and particularly preferably within the range from 280 to 650 MPa.

The loss tangent (tan δ) at 50° C. of the polymer material constituting the polishing layer exceeds 0.2, the polishing layer becomes too soft, and thus, flatness of a surface to be to polished may decrease or a polishing efficiency may be lowered, and, for example, from the viewpoint of flatness of a surface to be polished, the loss tangent (tans) at 50° C. of the polymer material constituting the polishing layer is preferably 0.15 or less, and more preferably 0.10 or less.

When the contact angle with water of the polymer material constituting the polishing layer exceeds 80°, scratches are easily generated. For example, from the viewpoint of suppression of scratches, the contact angle with water of the polymer material constituting the polishing layer is preferably 75° or less.

The polishing layer constituting the polishing pad of the present invention is preferably constituted with a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) of 55% or more. When the retention ratio of a tensile elastic modulus is less than 55%, change in polishing characteristics of the polishing pad due to moisture is large, and, for example, when the polishing pad is left in a wet state for several hours to several days after finishing polishing, problems such as decrease in a polishing rate may be caused. Therefore, for example, from the viewpoint of influence due to moisture, the retention ratio of a tensile elastic modulus is preferably 60% or more, and more preferably 75% or more.

The polishing layer constituting the polishing pad of the present invention is preferably constituted with a polymer material having a ratio ($E'_{23}/E'_{50}$) of a storage elastic modulus at 23° C. ($E'_{23}$) to a storage elastic modulus at 50° C. ($E'_{50}$) of 1.8 or less. When the ratio ($E'_{23}/E'_{50}$) is more than 1.8, the polishing characteristics such as a polishing rate of a polishing pad and the like are changed due to a temperature, and thus, when a wafer is polished, there is a tendency that a product with uniform quality is hardly obtained. Therefore, for example, from the viewpoint that a polishing pad with a constant polishing rate is obtained, the ratio ($E'_{23}/E'_{50}$) is preferably 1.7 or less, and more preferably 1.4 or less.

The polishing layer constituting the polishing pad of the present invention is preferably constituted with polyurethane obtained by reacting a polymer diol, an organic diisocyanate, and a chain extender. It is preferable that the polyurethane is thermoplastic polyurethane capable of being melt-molded, and a content of nitrogen atoms derived from the organic diisocyanate is 4.8% by mass or more and less than 6.0% by mass. When the content of nitrogen atoms is less than 4.8% by mass, the polishing pad becomes soft, and flatness of a surface to be polished decreases and a polishing efficiency tends to be lowered. On the other hand, when the content of nitrogen atoms is 6.0% by mass or more, scratches easily tend to be generated. Therefore, for example, from the viewpoints of flatness of a surface to be polished and suppression of scratches, the content of nitrogen atoms derived from the organic diisocyanate is preferably within the range from 4.9 to 5.8% by mass.

For the polymer diol used as a raw material of polyurethane constituting a polishing layer, any of polymer diols conventionally used in production of polyurethane can be used, and examples thereof include polyether diols such as polytetramethylene glycol, poly(methyltetramethylene glycol), polypropylene glycol, and polyethylene glycol; polyester diols such as polybutylene adipate diol, polybutylene sebacate diol, polyhexamethylene adipate diol, poly(3-methyl-1,5-pentamethylene adipate)diol, poly(3-methyl-1,5-pentamethylene sebacate)diol, polynonamethylene adipate diol, poly(2-methyl-1,8-octamethylene adipate)diol, and polycaprolactone diol; polycarbonate diols such as polyhexamethylene carbonate diol, and poly(3-methyl-1,5-pentamethylene carbonate)diol; and copolymer diols of the above described diols, and at least one of these substances can be used. Among these examples, use of a polymer diol having a ratio (C/O) of the number of carbon atoms (C) and the number of oxygen atoms (O) of 3 to 5 such as polytetramethylene glycol, polynonamethylene adipate diol, and poly(2-methyl-1,8-octamethylene adipate)diol is preferable since both of a contact angle with water and a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) of a polymer material constituting a polishing layer are easily set within the predetermined ranges. In the case of using a polymer diol having a ratio (C/O) of the number of carbon atoms (C) and the number of oxygen atoms (O) of less than 3, a retention ratio of a tensile elastic modulus of a polymer material constituting a polishing layer easily decreases, and on the other hand, in the case of using a polymer diol having a ratio (C/O) of the number of carbon atoms (C) and the number of oxygen atoms (O) of more than 5, a contact angle with water of a polymer material constituting a polishing layer easily increases. A number average molecular weight of a polymer diol is preferably 1400 to 5000, and more preferably 2000 to 3500 from the viewpoint of setting a ratio ($E'_{23}/E'_{50}$) of a storage elastic modulus at 23° C. ($E'_{23}$) to a storage elastic modulus at 50° C. ($E'_{50}$) of obtained polyurethane to 1.8 or less. In addition, the number average molecular weight of a polymer diol referred in this specification means a number average molecular weight calculated based on a hydroxyl group value measured in accordance with JIS K 1557.

For the organic diisocyanate used as a raw material of polyurethane constituting a polishing layer, any of organic diisocyanates conventionally used in production of polyurethane can be used, and examples thereof include isophorone diisocyanate, hexamethylene diisocyanate, norbornene diisocyanate, 2,4-tolylene diisocyanate, 2,6-tolylene diisocyanate, 4,4'-dicyclohexylmethane diisocyanate, 4,4'-diphenylmethane diisocyanate, and xylylene diisocyanate, and at least one of these substances can be used. Among these examples, 4,4'-diphenylmethane diisocyanate is preferably used from the viewpoint of abrasion resistance of the obtained polishing pad.

For the chain extender used as a raw material of polyurethane constituting a polishing layer, any of chain extenders conventionally used in production of polyurethane can be used. For the chain extender, a low molecular compound having a molecular weight of 300 or less and containing two or more of active hydrogen atoms capable of reacting with an isocyanate group in its molecule can be used, and examples thereof include diols such as ethylene glycol, diethylene glycol, 1,2-propanediol, 1,3-propanediol, 1,4-butanediol, neopentyl glycol, 1,6-hexanediol, 3-methyl-1,5-pentanediol, 1,4-bis(β-hydroxyethoxy)benzene, 1,4-cyclohexanediol, 1,4-cyclohexanedimethanol, and 1,9-nonanediol; and diamines such as ethylenediamine, trimethylenediamine, tetramethylenediamine, hexamethylenediamine, nonamethylenediamine, hydrazine, dihydrazide adipate, xylenediamine, isophoronediamine, piperazine, 4,4'-diaminodiphenylmethane, and 4,4'-methylene-bis(2-chloroaniline), and at least one of these substances can be used.

The polishing pad of the present invention can be used for chemical mechanical polishing with a known polishing slurry. The polishing slurry contains, for example, liquid mediums such as water and oil; polishing agents such as silica, alumina, cerium oxide, zirconium oxide, and silicon carbide; and components such as bases, acids, surfactants, oxidants, reducing agents, and chelating agents. When the chemical mechanical polishing is performed, a lubricant, a cooling agent, and the like may be used in combination with the polishing slurry according to necessity.

The chemical mechanical polishing can be performed by bringing a surface to be polished and a polishing pad into contact with each other via a polishing slurry under pressurization at a constant speed for a certain period of time, using a known chemical mechanical polishing machine. Although materials to be polished are not particularly limited, examples thereof include a crystal, silicon, glass, an optical substrate, an electronic circuit board, a multilayered wiring substrate, a hard disc, and the like. In particular, an object to be polished is preferably a silicon wafer or a semiconductor wafer. Specific examples of the semiconductor wafer include those having insulating films such as silicon oxide, silicon fluoride oxide, and organic polymers; wiring metallic films such as copper, aluminum, and tungsten; barrier metallic films such as tantalum, titanium, tantalum nitride, titanium nitride, and the like, on surfaces thereof, and in particular, the chemical mechanical polishing is useful for polishing a semiconductor wafer having a wiring metallic film made of copper on its surface. Polishing such a wiring metallic film having a pattern is also possible. A pitch of wiring in a pattern is different depending on products, and is generally about 50 nm to 100 μm in many cases.

EXAMPLES

The present invention will be more specifically described by way of examples; however, the present invention is not limited to these examples at all. Evaluations of physical properties and polishing characteristics of a cushion and a polishing pad described in the examples were performed by the following methods.

[Dynamic Compression Viscoelasticity of Cushion]

Using a dynamic viscoelasticity measurement device "FT Rheospectoler DVE-V4" manufactured by Rheology Co., Ltd. in a compression mode, a measurement was performed under conditions of a measurement frequency of 11 Hz or 88 Hz, a static load of 27.6 kPa, and an amplitude of 1 μm at a temperature increase rate of 3° C./min. A sample was in a circular shape having a diameter of 20 mm, and a thickness thereof was set to an actual thickness used as a cushion layer.

[Deformation Amount of Cushion Under Static Load]

Using a thermomechanical analyzer "TMA-4000" manufactured by Bruker AXS K.K., an inspection bar with a circular edge having a diameter of 5 mm (area of 0.196 cm$^2$) was applied to a sample (the thickness thereof was set to an actual thickness used as a cushion layer) in a state of no load, and a load was increased at a ratio of 50 g per a minute at 25° C., and at the time point when the pressure of the edge of the inspection bar reached 27.6 kPa (55.6 g as a load), the sample was kept for 60 seconds while the load was fixed, and the thickness of the sample was measured. Then, a load was again increased at a ratio of 50 g per a minute, and at the time point when the pressure of the edge of the inspection bar reached 41.4 kPa (83.4 g as a load), the sample was kept for 60 seconds while the load was fixed, and the thickness of the sample was measured.

A numerical value obtained by dividing a gap between the sample thickness at the time point when a pressure was 27.6 kPa and the sample thickness at the time point when a pressure was 41.4 kPa by a pressure gap of 13.8 kPa (=41.4 kPa−27.6 kPa) was defined as a deformation amount (unit μm/kPa) under a static load without applying dynamic stress.

[Tensile Elastic Modulus at 50° C. (After Leaving Under Conditions of 20° C. and 65% RH and After Saturation Swelling with Water at 50° C.)]

A No. 2 type test piece (JIS K 7113) was punched out from a film with a thickness of 300 μm prepared by a thermal pressing method, and the test piece left for 3 days under conditions of 20° C. and 65% RH was used as a dry sample, and a test sample immersed in warm water at 50° C. for 3 days was used as a water swelled sample. Using each sample, the sample was mounted on Autograph "AG5000" manufactured by SHIMADZU CORPORATION at a distance between chucks of 40 mm, and then stood still at an atmospheric temperature of 50° C. for 5 minutes to measure a tensile elastic modulus at a tensile speed of 50 mm/min. The tensile elastic modulus obtained by use of the dry sample was defined as "a tensile elastic modulus at 50° C. after leaving under conditions at 20° C. and 65% RH", and the tensile elastic modulus obtained by use of the water swelled sample was defined as "a tensile elastic modulus at 50° C. after saturation swelling with water at 50° C.".

[Storage Elastic Modulus (23° C. and 50° C.) and Loss Tangent (50° C.)]

An injection molded sheet having a width of 5 mm, a length of 30 mm and a thickness of 2 mm was prepared, and using a test piece obtained from the sheet thermally treated at 90° C. for 5 hours, a storage elastic modulus and a loss tangent were found by performing a measurement at a temperature increase rate of 3° C./min under conditions of a measurement frequency of 11 Hz, an automatic static load, an amplitude of 1 μm, an initial measurement length of 20 mm with a dynamic viscoelasticity measurement device "FT Rheospectoler DVE-V4" manufactured by Rheology Co., Ltd. in a tensile mode.

[Contact Angle with Water]

Using a film prepared by a heat pressing method and having a thickness of 300 μm, which was left under conditions of 20° C. and 65% RH for 3 days, a contact angle with water was measured using "Drop Master 500" manufactured by Kyowa Interface Science Co., Ltd.

[Oxide Film Polishing Performance]

A polishing pad was set in a polishing machine "MAT-BC15" available from MAT Co., Ltd., and using a diamond dresser (#100-coating ratio of 80%, diameter of 19 cm, mass of 1 kg) available from A. L. M. T. Corp., the surface of the polishing pad was subjected to grinding (hereinafter referred to as "conditioning") at a dresser rotational speed of 140 rpm and a platen rotational speed of 100 rpm for 1 hour, while flowing distilled water at a speed of 150 mL/min.

Then, while a liquid obtained by diluting a polishing slurry "SS25" available from Cabot Corporation 2 times with distilled water was fed at a speed of 120 mL/min, a silicon wafer with a diameter of 4 inches, which has a heat oxide film with a film thickness of 1000 nm on the surface thereof, was polished for 60 seconds under conditions of a platen rotational speed of 100 rpm, a head rotational speed of 99 rpm, and a polishing pressure of 27.6 kPa, and subsequently, conditioning was performed again for 30 seconds under the above described conditions. Then, the wafer was replaced to repeat polishing and conditioning again, and total 9 wafers were polished per each polishing pad.

Conditioning was then performed again for 30 seconds in the above described conditions, thereafter polishing a silicon wafer with a diameter of 4 inches, which has a pattern of an oxide film (PETEOS; Plasma Enhanced TetraEthylOrthoSilicate) on the surface thereof by a chemical gas phase deposition method, wherein a convex portion width is 30 μm, a concave portion width is 70 μm, a pitch is 100 μm, a thickness of a convex portion of the oxide film is 2000 nm, and an initial difference between a convex portion and a concave portion is 800 nm, under the same conditions as the above polishing conditions for 120 seconds.

For the wafer polished at last (wafer polished at the ninth) among the nine polished wafers having oxide films without patterns on their surfaces, thicknesses of the oxide film before and after polishing were measured at respective 49 points in the wafer surface to find polishing rates at the respective points. The mean value of the polishing rates at 49 points was defined as a polishing rate, and polishing uniformity was evaluated from a nonuniformity found by the following formula (1). As a value of the nonuniformity is smaller, the oxide film in the wafer surface is more uniformly polished and polishing uniformity is thus excellent.

$$\text{Nonuniformity}(\%) = (\sigma/R) \times 100 \tag{1}$$

(Provided that σ represents the standard deviation of the polishing rates at 49 points, and R represents the mean value of polishing rates at 49 points.)

Thicknesses of a convex portion and a concave portion in the oxide film before and after polishing of the tenth polished wafer having a pattern was measured at total 5 points of 4 points at a position of 10 mm from the wafer edge and 1 point at a position of the wafer central portion. A polishing rate of each point was found from a change amount of thicknesses of a convex portion and a concave portion in the oxide film, and the mean values of the 5 points were defined as polishing rates. A larger polishing rate of a convex portion and a smaller polishing rate of a concave portion are preferable since it takes less time to make a wafer surface flat and also flatness is accomplished with less polishing amount. Polishing uniformity was evaluated by a nonuniformity found from the following formula (2) for each of a convex portion and a concave portion. As a value of a nonuniformity is smaller, the oxide film in the wafer surface is more uniformly polished and polishing uniformity is thus excellent.

$$\text{Nonuniformity}(\%) = (\sigma/R) \times 100 \tag{2}$$

(Provided that σ represents the standard deviation of the polishing rates at 5 points, and R represents the mean value of polishing rates at 5 points.)

[Copper Film Polishing Performance]

A polishing pad was set in a polishing machine "MAT-BC15" available from MAT Co., Ltd., and using a diamond dresser (#100-coating ratio of 80%, diameter of 19 cm, mass of 1 kg) available from A. L. M. T. Corp., the surface of the polishing pad was subjected to conditioning at a dresser rotational speed of 140 rpm and a platen rotational speed of 100 rpm for 1 hour, while flowing distilled water at a speed of 150 mL/min.

Then, while a liquid obtained by adding 3.5 parts by mass of a hydrogen peroxide solution having a concentration of 30% by mass to 100 parts by mass of a polishing slurry "PL7101" available from FUJIMI INCORPORATED to be mixed was fed at a speed of 120 mL/min, a silicon wafer with a diameter of 4 inches, which has a copper film with a film thickness of 1500 nm on the surface thereof, was polished for 60 seconds under conditions of a platen rotational speed of 100 rpm, a head rotational speed of 99 rpm, and a polishing pressure of 27.6 kPa, and subsequently, conditioning was performed again for 30 seconds under the above described conditions. Then, the wafer was replaced to repeat polishing and conditioning again, and total 9 wafers were polished per each polishing pad.

Conditioning was then performed again for 30 seconds in the above described conditions, thereafter polishing a silicon wafer with a diameter of 4 inches, which has a pattern of a copper film on the surface thereof, wherein a convex portion width is 50 μm, a concave portion width is 50 μm, a pitch is 100 μm, a thickness of a convex portion of the copper film is 600 nm, and an initial difference between a convex portion and a concave portion is 400 nm, under the same conditions as the above polishing conditions for 30 seconds.

For the wafer polished at last (wafer polished at the ninth) among the nine polished wafers having copper films without patterns on their surfaces, thicknesses of the copper film before and after polishing were measured at respective 49 points in the wafer surface to find polishing rates at the respective points. The mean value of the polishing rates at 49 points was defined as a polishing rate, and polishing uniformity was evaluated from a nonuniformity found by the following formula (3). As a value of the nonuniformity is smaller, the copper film in the wafer surface is more uniformly polished and polishing uniformity is thus excellent.

$$\text{Nonuniformity}(\%) = (\sigma/R) \times 100 \tag{3}$$

(Provided that σ represents the standard deviation of the polishing rates at 49 points, and R represents the mean value of the polishing rates at 49 points.)

Thicknesses of a convex portion and a concave portion in the copper film before and after polishing of the tenth polished wafer having a pattern were measured at total 5 points of 4 points at a position of 10 mm from the wafer edge and 1 point at a position of the wafer central portion. A polishing rate of each point was found from a change amount of thicknesses of a convex portion and a concave portion in the copper film, and the mean values of the 5 points were defined as polishing rates of the convex portion and the concave portion, respectively. A larger polishing rate of a convex portion and a smaller polishing rate of a concave portion are preferable since it takes less time to make a wafer surface flat and also flatness is accomplished with less polishing amount. Polishing uniformity was evaluated by a nonuniformity found from the following formula (4) for each of a convex portion and a concave portion. As a value of a nonuniformity is smaller, the copper film in the wafer surface is more uniformly polished and polishing uniformity is thus excellent.

$$\text{Nonuniformity}(\%) = (\sigma/R) \times 100 \tag{4}$$

(Provided that σ represents the standard deviation of the polishing rates at 5 points, and R represents the mean value of polishing rates at 5 points.)

Reference Example 1

Production of Polishing Layer Having a Non-Foam Structure

Using polytetramethylene glycol having a number average molecular weight of 2000 [abbreviation: PTMG2000], poly (2-methyl-1,8-octamethylene-co-nonamethylene adipate) diol [abbreviation: PNOA; molar ratio of nonamethylene unit to 2-methyl-1,8-actamethylene unit=7 to 3] having a number average molecular weight of 2000, 1,4-cyclohexanedimethanol (abbreviation: CHDM), 1,4-butanediol [abbreviation: BD] and 4,4'-diphenylmethane diisocyanate [abbreviation:

MDI] by a mass ratio of PTMG2000:PNOA:CHDM:BD: MDI of 21.3:9.1:5.4:13.6:50.6 (content of nitrogen atoms derived from organic diisocyanate: 5.7% by mass), these materials were continuously fed into a twin screw extruder rotating coaxially by a metering pump and continuous melt polymerization was performed to produce thermoplastic polyurethane. A molten product of the generated thermoplastic polyurethane was continuously extruded into water in a strand state, thereafter being finely cut with a pelletizer to obtain a pellet. This pellet was dehumidified to be dried at 70° C. for 20 hours, thereby producing thermoplastic polyurethane. A tensile elastic modulus at 50° C. after saturation swelling with water at 50° C. of the obtained thermoplastic polyurethane was 686 MPa, a retention ratio of a tensile elastic modulus was 77%, a loss tangent (tan δ) at 50° C. was 0.035, a ratio ($E'_{23}/E'_{50}$) of a storage elastic modulus at 23° C. ($E'_{23}$) to a storage elastic modulus at 50° C. ($E'_{50}$) was 1.2, a contact angle with water was 71°.

The obtained thermoplastic polyurethane was charged into a single screw extrusion forming machine and extruded from a T-die to form a sheet having a thickness of 2 mm. Then, the surface of the obtained sheet was ground to form a uniform sheet having a thickness of 1.5 mm, thereafter forming a groove in a lattice state with a width of 2.0 mm and a depth of 1.0 mm at an interval of 15.0 mm on the sheet to produce a hard polishing layer in a circular shape with a diameter of 38 cm, which had a non-foam structure.

Reference Example 2

Production of Polishing Layer Having a Foam Structure

Using polytetramethylene glycol having a number average molecular weight of 1400 [abbreviation: PTMG1400], CHDM, and MDI by a mass ratio of PTMG1400:CHDM: MDI of 19.0:28.3:52.7 (content rate of nitrogen atoms derived from organic diisocyanate: 5.9% by mass), these materials were continuously fed into a twin screw extruder rotating coaxially by a metering pump and continuous melt polymerization was performed to produce thermoplastic polyurethane. A molten product of the generated thermoplastic polyurethane was continuously extruded into water in a strand state, thereafter being finely cut with a pelletizer to obtain a pellet. This pellet was dehumidified to be dried at 70° C. for 20 hours, thereby producing thermoplastic polyurethane. A tensile elastic modulus at 50° C. after saturation swelling with water at 50° C. of the obtained thermoplastic polyurethane was 565 MPa, a retention ratio of a tensile elastic modulus was 82%, a loss tangent (tan δ) at 50° C. was 0.040, a ratio ($E'_{23}/E'_{50}$) of a storage elastic modulus at 23° C. ($E'_{23}$) to a storage elastic modulus at 50° C. ($E'_{50}$) was 1.1, a contact angle with water was 74°.

The obtained thermoplastic polyurethane was charged into a single screw extrusion forming machine and extruded from a T-die to form a sheet having a thickness of 2 mm. The obtained sheet was then contained in a pressure-resistant container, and carbon dioxide was dissolved for 10 hours under conditions of a temperature of 110° C. and a pressure of 8 MPa to obtain a gas-dissolved sheet containing 3.6% by mass of carbon dioxide. After cooling to room temperature, a pressure was set to normal pressure, and the gas-dissolved sheet was taken out from the pressure-resistant container. The obtained gas-dissolved sheet was immersed in silicon oil at 120° C. for 3 minutes, then taken out from the silicon oil, and cooled to room temperature to obtain a foam. The density of the obtained foam was 0.85 g/cm³, and a bubble diameter thereof was about 20 μm. Then, the surface of the obtained foam sheet was ground to form a uniform sheet having a thickness of 1.5 mm, thereafter forming a groove in a lattice state with a width of 2.0 mm and a depth of 1.0 mm at an interval of 15.0 mm on the sheet to produce a hard polishing layer in a circular shape with a diameter of 38 cm, which had a foam structure.

Reference Example 3

Production of Cushion Layer (1)

Using poly(3-methyl-1,5-pentamethyleneadipate)diol [abbreviation: PMPA] having a number average molecular weight of 3600, BD and MDI by a mass ratio of PMPA:BD: MDI of 79.4:4.0:16.6 (content rate of nitrogen atoms: 1.9% by mass), these materials were continuously fed into a twin screw extruder rotating coaxially by a metering pump and continuous melt polymerization was performed to produce thermoplastic polyurethane. A molten product of the generated thermoplastic polyurethane was continuously extruded into water in a strand state, thereafter being finely cut with a pelletizer to obtain a pellet. This pellet was dehumidified to be dried at 60° C. for 20 hours, thereby producing thermoplastic polyurethane.

The obtained thermoplastic polyurethane was charged into a single screw extrusion forming machine and extruded from a T-die to form a sheet having a thickness of 2.5 mm. Then, the surface of the obtained sheet was ground to form a uniform sheet having a thickness of 2.0 mm, thereafter punching out to produce a cushion layer (1) in a circular shape with a diameter of 38 cm.

Reference Example 4

Production of Cushion Layer (5)

Using PMPA, BD and MDI by a mass ratio of PMPA:BD: MDI of 49.7:12.4:37.9 (content rate of nitrogen atoms: 4.2% by mass), these materials were continuously fed into a twin screw extruder rotating coaxially by a metering pump and continuous melt polymerization was performed to produce thermoplastic polyurethane. A molten product of the generated thermoplastic polyurethane was continuously extruded into water in a strand state, thereafter being finely cut with a pelletizer to obtain a pellet. This pellet was dehumidified to be dried at 70° C. for 20 hours, thereby producing thermoplastic polyurethane.

The obtained thermoplastic polyurethane was charged into a single screw extrusion forming machine and extruded from a T-die to form a sheet having a thickness of 2.0 mm. Then, the surface of the obtained sheet was ground to form a uniform sheet having a thickness of 1.0 mm, thereafter punching out to produce a cushion layer (5) in a circular shape with a diameter of 38 cm.

Reference Example 5

Production of Cushion Layer (6)

Using poly(1,4-butylene adipate) diol [abbreviation: PBA] having a number average molecular weight of 1000, BD and MDI by a mass ratio of PBA:BD:MDI of 70.5:3.2:26.3 (content of nitrogen atoms: 2.9% by mass), these materials were continuously fed into a twin screw extruder rotating coaxially by a metering pump and continuous melt polymerization was performed to produce thermoplastic polyurethane. A molten product of the generated thermoplastic polyurethane was continuously extruded into water in a strand state, thereafter being finely cut with a pelletizer to obtain a pellet. This pellet was dehumidified to be dried at 50° C. for 20 hours, thereby producing thermoplastic polyurethane.

The obtained thermoplastic polyurethane was charged into a single screw extrusion forming machine and extruded from a T-die to form a sheet having a thickness of 2.0 mm. Then, the surface of the obtained sheet was ground to form a uniform sheet having a thickness of 1.5 mm, thereafter punching out to produce a cushion layer (6) in a circular shape with a diameter of 38 cm.

Example 1

The hard polishing layer having a non-foam structure obtained in Reference Example 1 and the cushion layer (1) obtained in Reference Example 3 were laminated with an adhesive double coated sheet to produce a polishing pad having a diameter of 38 cm. The dynamic compression viscoelasticity of the cushion layer was as shown in Table 1. A deformation amount of the cushion layer under a static load, which was obtained as a reference value, was 0.71 μm/kPa.

As a result of performing a polishing test (test of oxide film polishing performance and copper film polishing performance), as shown in Tables 2 and 3, both of a polishing rate and a polishing uniformity of a wafer without a pattern were preferable (a larger polishing rate and a smaller nonuniformity are better.) Both of a polishing rate and a polishing uniformity of a convex portion and a concave portion of a wafer having a pattern were preferable (a larger polishing rate of a convex portion and a smaller polishing rate of a concave portion are better, and smaller nonuniformities of both of a convex portion and a concave portion are better.)

Example 2

A commercially available chloroprene rubber sheet having a thickness of 2.0 mm (made by SOGO LABORATORY GLASS WORKS CO., LTD.) was punched out to form a cushion layer in a circular shape having a diameter of 38 cm [cushion layer (2)], and then, the cushion layer (2) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1. A deformation amount of the cushion layer under a static load, which was obtained as a reference value, was 0.82 μm/kPa.

As a result of performing a polishing test (test of oxide film polishing performance and copper film polishing performance), as shown in Tables 2 and 3, both of a polishing rate and a polishing uniformity of a wafer without a pattern were preferable (a larger polishing rate and a smaller nonuniformity are better.) Both of a polishing rate and a polishing uniformity of a convex portion and a concave portion of a wafer having a pattern were preferable (a larger polishing rate of a convex portion and a smaller polishing rate of a concave portion are better, and smaller nonuniformities of both of a convex portion and a concave portion are better.)

Example 3

A commercially available chloroprene rubber sheet having a thickness of 1.0 mm (made by SOGO LABORATORY GLASS WORKS CO., LTD.) was punched out to form a cushion layer in a circular shape having a diameter of 38 cm [cushion layer (3)], and then, the cushion layer (3) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1. A deformation amount of the cushion layer under a static load, which was obtained as a reference value, was 0.64 μm/kPa.

As a result of performing a polishing test (test of oxide film polishing performance and copper film polishing performance), as shown in Tables 2 and 3, both of a polishing rate and a polishing uniformity of a wafer without a pattern were preferable (a larger polishing rate and a smaller nonuniformity are better.) Both of a polishing rate and a polishing uniformity of a convex portion and a concave portion of a wafer having a pattern were preferable (a larger polishing rate of a convex portion and a smaller polishing rate of a concave portion are better, and smaller nonuniformities of both of a convex portion and a concave portion are better.)

Example 4

A commercially available silicone rubber sheet having a thickness of 1.5 mm (made by KENIS, Ltd.) was punched out to form a cushion layer in a circular shape having a diameter of 38 cm [cushion layer (4)], and then, the cushion layer (4) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, both of a polishing rate and a polishing uniformity of a wafer without a pattern were preferable (a larger polishing rate and a smaller nonuniformity are better.) Both of a polishing rate and a polishing uniformity of a convex portion and a concave portion of a wafer having a pattern were preferable (a larger polishing rate of a convex portion and a smaller polishing rate of a concave portion are better, and smaller nonuniformities of both of a convex portion and a concave portion are better.)

Comparative Example 1

The hard polishing layer having a non-foam structure obtained in Reference Example 1 and the cushion layer (5) obtained in Reference Example 4 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, although a polishing rate and a polishing uniformity of a wafer without a pattern were preferable, a polishing uniformity of a convex portion of a wafer having a pattern was inferior as compared to cases of examples.

Comparative Example 2

The hard polishing layer having a non-foam structure obtained in Reference Example 1 and the cushion layer (6) obtained in Reference Example 5 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, although a polishing rate and a polishing uniformity of a wafer without a pattern were preferable, a polishing uniformity of a convex portion of a wafer having a pattern was inferior as compared to cases of examples.

Comparative Example 3

A commercially available natural rubber sheet having a thickness of 2.0 mm (made by SOGO LABORATORY GLASS WORKS CO., LTD.) was punched out to form a cushion layer in a circular shape having a diameter of 38 cm [cushion layer (7)], and then, the cushion layer (7) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, although a polishing rate and a polishing uniformity of a wafer without a pattern were preferable, a polishing uniformity of a convex portion of a wafer having a pattern was inferior as compared to cases of examples.

Comparative Example 4

A commercially available silicone rubber sheet having a thickness of 1.5 mm (soft type as compared to the silicone rubber sheet used in Example 4; made by SANPLATEC CO., LTD.) was punched out to form a cushion layer in a circular shape having a diameter of 38 cm [cushion layer (8)], and then, the cushion layer (8) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, although a polishing rate and a polishing uniformity of a wafer without a pattern were preferable, a polishing uniformity of a convex portion of a wafer having a pattern was inferior as compared to cases of examples.

Comparative Example 5

A commercially available foamed polyurethane (density of 0.32 g/cm$^3$) sheet (made by INOAC CORPORATION) having a thickness of 1.5 mm was punched out to form a cushion layer in a circular shape having a diameter of 38 cm [cushion layer (9)], and then, the cushion layer (9) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, although a polishing rate and a polishing uniformity of a wafer without a pattern were preferable, a polishing uniformity of a convex portion of a wafer having a pattern was inferior as compared to cases of examples.

Comparative Example 6

A commercially available foamed polyurethane (density of 0.24 g/cm$^3$) sheet (made by INOAC CORPORATION) having a thickness of 3.0 mm was punched out to form a cushion layer in a circular shape having a diameter of 38 cm [cushion layer (10)], and then, the cushion layer (10) and the hard polishing layer having a non-foam structure obtained in Reference Example 1 were laminated with an adhesive double coated sheet to produce a polishing pad having a diameter of 38 cm. The dynamic compression viscoelasticity of the cushion layer was as shown in Table 1.

As a result of performing a polishing test (test of oxide film polishing performance and copper film polishing performance), as shown in Tables 2 and 3, a polishing rate of a wafer without a pattern was inferior as compared to cases of examples and a polishing uniformity was also inferior. A polishing rate and a polishing uniformity of a convex portion of a wafer having a pattern were inferior as compared to cases of examples.

Example 5

A polishing pad having a diameter of 38 cm was produced in the same manner as in Example 4, except for using the hard polishing layer having a foam structure obtained in Reference Example 2 in place of the hard polishing layer having a non-foam structure obtained in Reference Example 1.

Results of performing the polishing test were as shown in Tables 2 and 3.

Comparative Example 7

A polishing pad having a diameter of 38 cm was produced in the same manner as in Comparative Example 4, except for using the hard polishing layer having a foam structure obtained in Reference Example 2 in place of the hard polishing layer having a non-foam structure obtained in Reference Example 1.

Results of performing the polishing test were as shown in Tables 2 and 3.

TABLE 1

| | Dynamic compression viscoelasticity of cushion | | | | | |
|---|---|---|---|---|---|---|
| | 23° C., 11 Hz | | 50° C., 11 Hz | | 23° C., 88 Hz | |
| | Phase difference between dynamic stress and deformation | [Maximum value of deformation amount]/[maximum value of dynamic stress] | Phase difference between dynamic stress and deformation | [Maximum value of deformation amount]/[maximum value of dynamic stress] | Phase difference between dynamic stress and deformation | [Maximum value of deformation amount]/[maximum value of dynamic stress] |
| Example 1 | 2.0° | 1.06 μm/kPa | 2.0° | 1.14 μm/kPa | 5.4° | 1.04 μm/kPa |
| Example 2 | 3.8° | 0.84 μm/kPa | 3.9° | 0.86 μm/kPa | 7.6° | 0.80 μm/kPa |
| Example 3 | 3.8° | 0.91 μm/kPa | 3.2° | 0.98 μm/kPa | 7.8° | 0.88 μm/kPa |
| Example 4 | 1.3° | 1.13 μm/kPa | 1.2° | 1.16 μm/kPa | 3.2° | 1.13 μm/kPa |

TABLE 1-continued

| | Dynamic compression viscoelasticity of cushion | | | | | |
|---|---|---|---|---|---|---|
| | 23° C., 11 Hz | | 50° C., 11 Hz | | 23° C., 88 Hz | |
| | Phase difference between dynamic stress and deformation | [Maximum value of deformation amount]/[maximum value of dynamic stress] | Phase difference between dynamic stress and deformation | [Maximum value of deformation amount]/[maximum value of dynamic stress] | Phase difference between dynamic stress and deformation | [Maximum value of deformation amount]/[maximum value of dynamic stress] |
| Comparative Example 1 | 2.6° | 0.39 μm/kPa | 2.2° | 0.39 μm/kPa | 6.3° | 0.36 μm/kPa |
| Comparative Example 2 | 5.2° | 0.87 μm/kPa | 4.7° | 0.88 μm/kPa | 10.0° | 0.81 μm/kPa |
| Comparative Example 3 | 6.2° | 0.81 μm/kPa | 6.1° | 0.83 μm/kPa | 10.7° | 0.67 μm/kPa |
| Comparative Example 4 | 8.0° | 0.73 μm/kPa | 8.6° | 0.65 μm/kPa | 13.3° | 0.65 μm/kPa |
| Comparative Example 5 | 17.4° | 0.86 μm/kPa | 8.4° | 1.18 μm/kPa | 24.6° | 0.54 μm/kPa |
| Comparative Example 6 | 18.3° | 1.77 μm/kPa | 8.3° | 2.42 μm/kPa | 26.8° | 1.02 μm/kPa |

TABLE 2

| | Wafer having oxide film on surface (without pattern) | | Wafer having oxide film pattern on surface | | | |
|---|---|---|---|---|---|---|
| | | | Convex portion in pattern | | Concave portion in pattern | |
| | Polishing rate (nm/min) | Nonuniformity (%) | Polishing rate (nm/min) | Nonuniformity (%) | Polishing rate (nm/min) | Nonuniformity (%) |
| Example 1 | 156 | 3.5 | 514 | 2.6 | 122 | 6.7 |
| Example 2 | 159 | 4.1 | 506 | 4.4 | 127 | 8.2 |
| Example 3 | 161 | 3.3 | 522 | 4.0 | 132 | 7.3 |
| Example 4 | 153 | 3.1 | 515 | 2.3 | 118 | 7.2 |
| Comparative Example 1 | 167 | 3.5 | 530 | 9.3 | 121 | 8.8 |
| Comparative Example 2 | 152 | 4.3 | 498 | 6.0 | 128 | 7.5 |
| Comparative Example 3 | 160 | 3.9 | 523 | 6.5 | 135 | 8.4 |
| Comparative Example 4 | 145 | 4.4 | 481 | 7.8 | 110 | 9.0 |
| Comparative Example 5 | 148 | 4.0 | 473 | 10.3 | 124 | 9.1 |
| Comparative Example 6 | 94 | 6.5 | 354 | 13.5 | 108 | 15.1 |
| Example 5 | 148 | 5.3 | 501 | 4.7 | 148 | 8.9 |
| Comparative Example 7 | 143 | 5.6 | 492 | 8.4 | 143 | 10.5 |

TABLE 3

| | Wafer having copper film on surface (without pattern) | | Wafer having copper film pattern on surface | | | |
|---|---|---|---|---|---|---|
| | | | Convex portion in pattern | | Concave portion in pattern | |
| | Polishing rate (nm/min) | Nonuniformity (%) | Polishing rate (nm/min) | Nonuniformity (%) | Polishing rate (nm/min) | Nonuniformity (%) |
| Example 1 | 705 | 6.2 | 793 | 4.0 | 252 | 6.5 |
| Example 2 | 721 | 7.8 | 830 | 6.1 | 272 | 8.7 |
| Example 3 | 715 | 7.4 | 785 | 5.8 | 259 | 8.5 |
| Example 4 | 708 | 6.0 | 797 | 3.8 | 240 | 6.6 |
| Comparative Example 1 | 730 | 6.6 | 829 | 11.8 | 230 | 10.8 |
| Comparative Example 2 | 707 | 7.5 | 808 | 8.6 | 265 | 11.0 |
| Comparative Example 3 | 721 | 7.1 | 823 | 9.5 | 273 | 11.2 |

TABLE 3-continued

| | Wafer having copper film on surface (without pattern) | | Wafer having copper film pattern on surface | | | |
|---|---|---|---|---|---|---|
| | | | Convex portion in pattern | | Concave portion in pattern | |
| | Polishing rate (nm/min) | Nonuniformity (%) | Polishing rate (nm/min) | Nonuniformity (%) | Polishing rate (nm/min) | Nonuniformity (%) |
| Comparative Example 4 | 715 | 7.5 | 806 | 10.2 | 248 | 12.3 |
| Comparative Example 5 | 712 | 6.8 | 821 | 13.3 | 293 | 15.8 |
| Comparative Example 6 | 645 | 10.5 | 715 | 17.4 | 317 | 13.7 |
| Example 5 | 734 | 7.9 | 799 | 5.7 | 279 | 8.9 |
| Comparative Example 7 | 725 | 8.7 | 779 | 9.3 | 263 | 11.4 |

As obvious from Tables 2 and 3, wafers having patterns on their surfaces can be particularly uniformly polished in Examples 1 to 5. Contrary to these examples, polishing uniformity of convex portions in patterns were poor in Comparative Examples 1 to 7 as compared to Examples 1 to 5, and in Comparative Example 6, a polishing rate was also inferior. Comparisons between Example 4 and Comparative Example 4, and between Example 5 and Comparative Example 7 revealed that the effects of the cushion layer of the present invention exhibit more significantly when a polishing layer having a non-foam structure was used and, in particular, in the case of a wafer using an oxide film pattern on its surface, a polishing rate and polishing uniformity of a concave portion of the pattern were also excellent when a polishing layer having a non-foam structure was used.

INDUSTRIAL APPLICABILITY

According to the present invention, a polishing pad that is useful for polishing a material to be polished such as a semiconductor wafer at good precision and high polishing efficiency, and a cushion for a polishing pad used for producing the polishing pad.

This application is based on a patent application No. 2007-71975 filed in Japan, the contents of which are incorporated in full herein by this reference.

The invention claimed is:

1. A polishing pad having a cushion layer and a polishing layer, wherein
the cushion layer comprises polyurethane, chloroprene rubber, or silicone rubber,
the polishing layer comprises a polymer material having a tensile elastic modulus at 50° C. after saturation swelling with water at 50° C. of 130 to 800 MPa, a loss tangent at 50° C. of 0.2 or less, and a contact angle with water of 80° or less, and
when a dynamic compression viscoelasticity measurement is performed on the cushion layer under conditions of 23° C., a static load of 27.6 kPa, a frequency of 11 Hz and an amplitude of 1 μm,
(1) a phase difference between dynamic stress and deformation is 4° or less, and
(2) a ratio of the maximum value of the deformation amount to the maximum value of the dynamic stress ([maximum value of deformation amount]/[maximum value of dynamic stress]) is 0.5 μm/kPa or more.

2. The polishing pad of claim 1, wherein the polishing layer comprises a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) or 55% or more.

3. The polishing pad of claim 1, wherein the polishing layer comprises a polymer material having a ratio ($E'_{23}/E'_{50}$) of a storage elastic modulus at 23° C. ($E'_{23}$) to a storage elastic modulus at 50° C. ($E'_{50}$) of 1.8 or less.

4. The polishing pad of claim 1, wherein the polishing layer comprises polyurethane obtained by reacting a polymer diol, an organic diisocyanate, and a chain extender.

5. The polishing pad of claim 4, wherein the polyurethane is thermoplastic polyurethane having a content of nitrogen atoms derived from the organic diisocyanate of 4.8% by mass or more and less than 6.0% by mass.

6. The polishing pad of claim 1, wherein, when the dynamic compression viscoelasticity measurement is performed on the cushion layer under conditions of 50° C., a static load of 27.6 kPa, a frequency of 11 Hz and an amplitude of 1 μm,
(3) a phase difference between dynamic stress and deformation is 4° or less, and
(4) a ratio of the maximum value of the deformation amount to the maximum value of the dynamic stress ([maximum value of deformation amount]/[maximum value of dynamic stress]) is 0.5 to 1.5 μm/kPa.

7. The polishing pad of claim 6, wherein the polishing layer is a resin layer with a non-foam structure.

8. The polishing pad of claim 6, wherein the polishing layer comprises a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) or 55% or more.

9. The polishing pad of claim 6, wherein the polishing layer comprises a polymer material having a ratio ($E'_{23}/E'_{50}$) of a storage elastic modulus at 23° C. ($E'_{23}$) to a storage elastic modulus at 50° C. ($E'_{50}$) of 1.8 or less.

10. The polishing pad of claim 6, wherein the polishing layer comprises polyurethane obtained by reacting a polymer diol, an organic diisocyanate, and a chain extender.

11. The polishing pad of claim 10, wherein the polyurethane is thermoplastic polyurethane having a content of nitrogen atoms derived from the organic diisocyanate of 4.8% by mass or more and less than 6.0% by mass.

12. The polishing pad of claim 6, wherein, when the dynamic compression viscoelasticity measurement is performed on the cushion layer under conditions of 23° C., a static load of 27.6 kPa, a frequency of 88 Hz and an amplitude of 1 μm, (5) a phase difference between dynamic stress and deformation is 8° or less, and (6) a ratio of the maximum value of the deformation amount to the maximum value of the dynamic stress ([maximum value of deformation amount]/[maximum value of dynamic stress]) is 0.5 to 1.5 µm/kPa.

13. The polishing pad of claim 12, wherein the polishing layer is a resin layer with a non-foam structure.

14. The polishing pad of claim 12, wherein the polishing layer comprises a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) or 55% or more.

15. The polishing pad of claim 12, wherein the polishing layer comprises a polymer material having a ratio ($E'_{23}/E'_{50}$) of a storage elastic modulus at 23° C. ($E'_{23}$) to a storage elastic modulus at 50° C. ($E'_{50}$) of 1.8 or less.

16. The polishing pad of claim 12, wherein the polishing layer comprises polyurethane obtained by reacting a polymer diol, an organic diisocyanate, and a chain extender.

17. The polishing pad of claim 16, wherein the polyurethane is thermoplastic polyurethane having a content of nitrogen atoms derived from the organic diisocyanate of 4.8% by mass or more and less than 6.0% by mass.

18. The polishing pad of claim 1, wherein, when the dynamic compression viscoelasticity measurement is performed on the cushion layer under conditions of 23° C., a static load of 27.6 kPa, a frequency of 88 Hz and an amplitude of 1 µm, (3) a phase difference between dynamic stress and deformation is 8° or less, and (4) a ratio of the maximum value of the deformation amount to the maximum value of the dynamic stress ([maximum value of deformation amount]/[maximum value of dynamic stress]) is 0.5 to 1.5 pm/kPa.

19. The polishing pad of claim 18, wherein the polishing layer is a resin layer with a non-foam structure.

20. The polishing pad of claim 18, wherein the polishing layer comprises a polymer material having a retention ratio of a tensile elastic modulus (value obtained by dividing a tensile elastic modulus at 50° C. after saturation swelling with water at 50° C. by a tensile elastic modulus at 50° C. after leaving under conditions of 20° C. and 65% RH to multiply 100) or 55% or more.

21. The polishing pad of claim 18, wherein the polishing layer comprises a polymer material having a ratio ($E'_{23}/E'_{50}$) of a storage elastic modulus at 23° C. ($E'_{23}$) to a storage elastic modulus at 50° C. ($E'_{50}$) of 1.8 or less.

22. The polishing pad of claim 18, wherein the polishing layer comprises polyurethane obtained by reacting a polymer diol, an organic diisocyanate, and a chain extender.

23. The polishing pad of claim 22, wherein the polyurethane is thermoplastic polyurethane having a content of nitrogen atoms derived from the organic diisocyanate of 4.8% by mass or more and less than 6.0% by mass.

24. The polishing pad of claim 1, wherein the polishing layer is a resin layer with a non-foam structure.

* * * * *